United States Patent [19]

Tucker

[11] 4,151,677
[45] May 1, 1979

[54] SOUNDING TOY

[76] Inventor: John W. Tucker, 10-38th Ave., Ile Perrot, Quebec, Canada

[21] Appl. No.: 768,645

[22] Filed: Feb. 14, 1977

[51] Int. Cl.² .............................................. A63H 5/00
[52] U.S. Cl. ................................... 46/175 R; 46/189; 116/56; 280/289 R
[58] Field of Search ............... 46/174, 177, 189, 192, 46/175 R, 191; 116/56; 280/289 R, 1.1 R

[56] References Cited

U.S. PATENT DOCUMENTS

| | | | |
|---|---|---|---|
| 2,630,655 | 3/1953 | Duncan | 46/111 |
| 2,660,973 | 12/1953 | Portlance | 116/56 |
| 3,289,348 | 12/1966 | Terry | 46/175 |
| 3,677,446 | 7/1972 | Guyer, Jr. et al. | 222/177 |
| 3,716,944 | 2/1973 | Mizrahi | 46/175 R |
| 3,827,178 | 8/1974 | Warneke | 46/175 R |
| 3,905,151 | 9/1975 | Zweigle | 46/174 |

Primary Examiner—Louis G. Mancene
Assistant Examiner—Mickey Yu
Attorney, Agent, or Firm—Charles E. Brown

[57] ABSTRACT

The disclosure teaches a novel noise making accessory for vehicles having spoked wheels such as bicycles or the like, and, more specifically, teaches such a noise making accessory which is adjustable to produce different sounds. The accessory includes a plurality of fingers which can be selectively positioned to extend into the path of travel of the spokes of one of the wheels of the vehicle. As the fingers are of different sizes, different sounds will be produced when a different one or different ones of the fingers extend into the path of travel of the spokes. The spokes can be of different lengths, widths, thicknesses, or a combination of the above. The objective of the accessory is to produce a motor-like sound.

8 Claims, 5 Drawing Figures

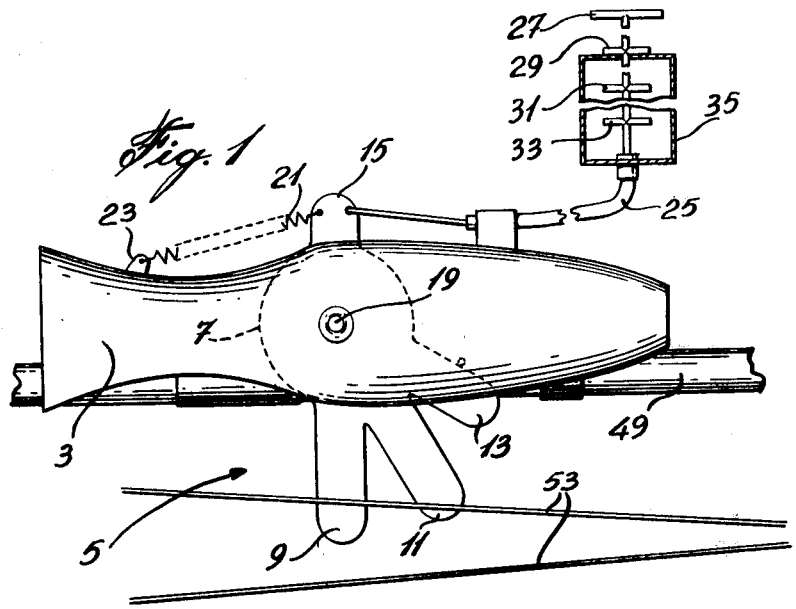
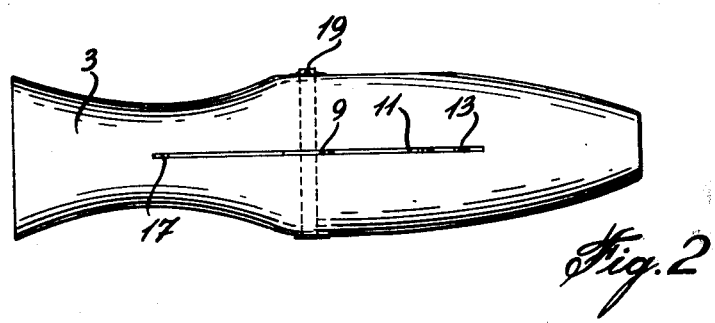
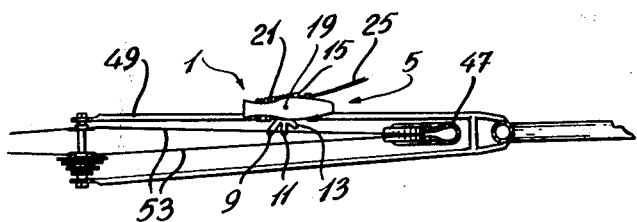

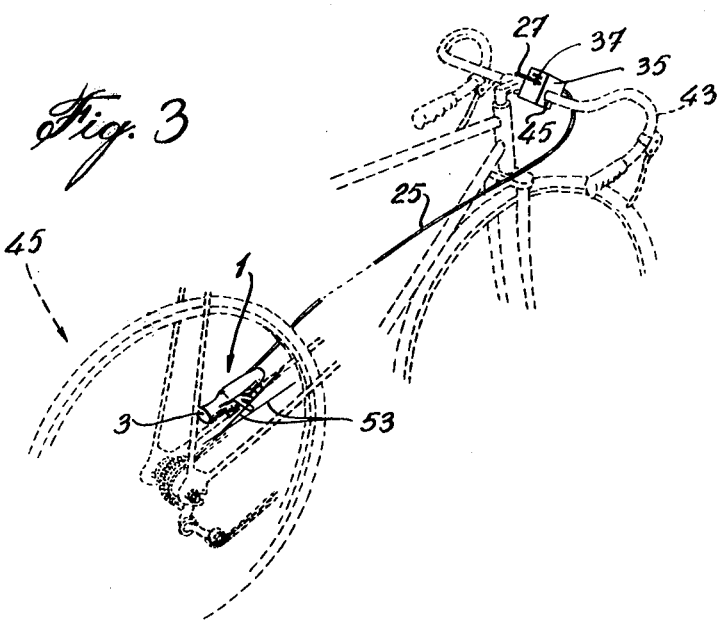
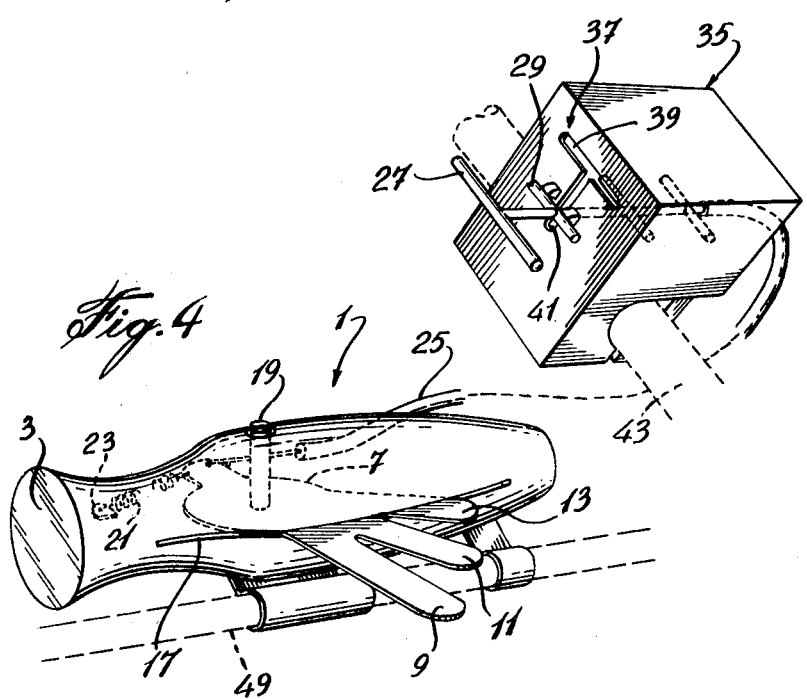

SOUNDING TOY

BACKGROUND OF THE INVENTION (a) Field of the Invention

This invention relates to a noise making accessory for vehicles having spoked wheels such as bicycles or the like. More specifically, this invention relates to such an accessory adjustable to produce different sounds.

(b) Statement of the Prior Art

With the increasing popularity of bicycles as recreational facilities, there is an increasing demand for accessories for bicycles. Especially desirable to young children are noise makers which provide motor-like sounds. Presently available ones of such noise makers produce only a single sound which is not realistic when compared to sounds made by actual motors which vary in frequency with the speed at which the engine is running.

SUMMARY OF THE INVENTION

It is therefore an object of the invention to provide a noise making accessory for vehicles having spoked wheels such as bicycles or the like which is adjustable to provide sounds at different frequencies.

It is a more specific object of the invention to provide such an accessory which includes a plurality of vibratable fingers, each of a different size, whereby to produce sounds at different frequencies.

It is a still more specific object of the invention to provide such an accessory wherein the fingers are selectively engageable, with the spokes of one of the wheels of the vehicle to thereby produce said sounds.

In accordance with the invention, an accessory of the type described comprises a plurality of vibratable fingers which can be selectively positioned to extend into the path of travel of the spokes of one wheel of the vehicle, the fingers being of different sizes so that different sounds are produced when a different one or ones of the fingers extend into the path of travel of the spokes.

In accordance with one embodiment of the invention a noise making accessory for vehicles having spoked wheels such as bicycles or the like for mounting on the bicycles adjacent the spokes of one of the wheels thereof, comprises;

a main body;

a finger bearing member extending through said body from side to side thereof;

said finger bearing member being mounted for rotation within said body;

a plurality of different sized fingers extending from one end of said finger bearing member; and means for rotating said finger bearing member;

whereby, in operation by rotation of said finger bearing member, and said fingers therewith, a different one, or different ones, of said fingers will be positioned in the path of travel of said spokes. The body may be a hollow shell-like structure, and said finger bearing member may be mounted for rotation on an axle extending through said body from the top to the bottom thereof. Said finger bearing member may comprise a plate-like structure somewhat circular in shape. Said fingers preferably extend from the periphery of said plate-like member; said fingers being positioned adjacent each other and angularly offset from each other.

Each finger may be of a length different from the length of every other finger, and the longest finger is at one end of the fingers and the shortest finger is at the other end of the fingers, the fingers between said longest and said shortest finger decreasing in length from said longest finger to said shortest finger.

Three fingers preferably extend from the periphery of said plate-like member. Each finger may be of a thickness different from the thickness of every other finger or each finger may be of a width different from the width of every other finger.

A tab may extend from the other end of said finger bearing member;

and wherein said means for rotating said finger bearing member comprises;

an actuator cable, attached, at one end thereof, to said tab, and for mounting, at the other end thereof, on the handle bars of a bicycle;

whereby, by pulling on said cable, said finger bearing member is rotated.

The accessory may further comprise a spring having one end thereof attached to said tab and the other end thereof attached to a fixed point on said body;

whereby said finger bearing member is urged to the non-tensioned position of said spring.

Said cable may comprise a series of spaced cross bars at the other end thereof;

and further including actuator cable position maintaining means, comprising;

a box-like structure through which said cable extends;

a T-shaped opening in the top of said box-like structure;

whereby, to pull the cable and the cross bars through the box-like structure, the cable is slid into the head of the T-shaped opening so that the cross bars can pass through the opening; and when the position of the cable is to be maintained, the cable is slid into the leg of the T-shaped opening preventing the cross bars from moving through the opening.

Preferably, said body, said finger bearing member and said fingers are made of a plastic material.

BRIEF DESCRIPTION OF THE DRAWINGS

The invention will be better understood by an examination of the following description, together with the accompanying drawings which illustrate one embodiment of the invention, and in which:

FIG. 1 is a side view of the illustrative embodiment;

FIG. 2 is a top view of the illustrative embodiment;

FIG. 3 illustrates a cable position maintaining means;

FIG. 4 illustrates how the accessory would be mounted adjacent the back wheel of a bicycle, and FIG. 5 is a section through 5—5 of FIG. 4.

DESCRIPTION OF A PREFERRED EMBODIMENT

Referring to FIG. 1, the accessory, indicated generally at 1, includes a body 3 which is preferably a hollow, shell-like structure having a fanciful shape. In the illustrated embodiment, the body is somewhat jet shaped. It is contemplated that the body will be made of a plastic material in order to keep the weight and the cost down.

Extending through the body 3, from side to side thereof, is finger bearing member 5 which includes a somewhat circular plate-like part 7 having fingers 9,11 and 13 extending peripherally from one end thereof. The fingers are made to be vibratable to produce a sound, and are all of different sizes to thereby produce different sounds. In the drawings, they are shown to be of a different length. However, as will be apparent, the sizes of the fingers can be varied by varying other properties thereof such as the width or thickness of the fingers, or by varying combinations of the above properties. The fingers are made of different sizes so that they will vibrate at different frequencies to thereby produce different sounds during vibration.

The fingers are disposed adjacent to each other and are angularly offset from each other. Preferably, the size of the fingers vary in sequence. Thus, in FIG. 1, the longest finger 9 is at one end of the fingers, and the shortest, 13, is at the other end. The length of finger 11 is greater than 13 but less than 9.

The finger bearing member and the fingers will also preferably be made of a plastic material. To simplify production, the fingers are made integral with the finger bearing member.

Extending from the other end of the plate-like member 7 is a tab 15, which may also be made integral with 7, whose function will be discussed below.

As can be seen in FIG. 2, the plate-like member 7 extends through a slot 17 in the body 3. When the body is a hollow shell, aligned slots 17 are provided on both sides of the body. If the body is solid, then the slot 17 extends all the way through the body from side to side thereof.

The finger bearing member 5 is mounted for rotation in the body 3 on axle 19 which extends through the body from the top to the bottom thereof. By rotating the finger bearing member, it is possible to change the position of each finger relative to the fixed body.

Spring 21 is attached, at one end thereof, to tab 15, and, at the other end thereof to a fixed point on the body such as tab 23. As the finger bearing member will be moved to different positions, as will be discussed below, it is required to provide means for automatically returning the finger bearing member to a neutral position, and the spring arrangement constitutes such a means. As will be appreciated, the neutral position is a function of the way the spring is attached, and the locations at which it is attached.

Also attached to the tab 15 is an actuating cable 25 which is mounted, at the other end thereof, on the handle bars of the bicycle, or at some convenient location of the vehicle on which the accessory is used. The end of the cable constitutes the control element for the accessory. Disposed across the cable at the other end thereof are a plurality of spaced cross bars 27-33, and a cable retaining means is also mounted at the other end of the cable 25. As seen in FIG. 3, the means 35 includes a top surface having a T-shaped opening 37 with a head 39 and a leg 41. The means 35 is mounted on the handle bar 43 of a bicycle by means 45 such as a clamp, and cable 25 extends through 35.

Referring now to FIGS. 4 and 5, the rear end 45 of a bicycle includes a rear wheel 47 rotatably mounted in rear fork 49. The accessory 1 is mounted about half way down the rear fork by means 51 such as a clamp. The rear wheel includes a plurality of spokes 53, and, as can be seen in FIG. 5, one or more of the fingers of the accessory will extend into the path of travel of the spokes as the wheel rotates. When the spokes hit the fingers in their path of travel, they will cause the fingers to vibrate and to emit a sound. As the fingers are of different sizes, the frequency of the sound produced will differ with the differing fingers. Thus, it is possible to produce different sounds by moving a different one, or different ones, of the fingers into the path of travel.

In operation, the accessory works as follows:

To select the fingers for positioning in the path of travel of the spokes, the actuating cable 25 is either pulled forward, or released to move backward by the action of the tension in the spring 21. It is noted that the width of the top cross bar 27 is greater than the width of any other cross bar and, especially, is greater than the width of head 39 of the opening 7. This is to prevent the cross bar 27 from passing through the opening 37 to thereby insure that at least a position of the cable 25 will remain at the top side of the means 35 at all times.

As will be obvious from FIG. 2, in one position of the finger bearing member 5, the spring is not under tension. This position is referred to as the neutral position of the accessory. In the illustrated embodiment, fingers will extend into the path of travel of the spokes when the accessory is in the neutral position. However, by design modification, the position of the fingers could be altered so that no fingers will extend into the path of travel of the spokes when the accessory is in the neutral position. Specifically, all of the fingers would be moved in a clockwise direction along the periphery of the plate 7 until finger 9 extends substantially along the longitudinal axis of the body 3. Such an arrangement is, of course, within the scope of the instant invention.

In order to shift the accessory from its neutral position to some other position, the cable 25 is slid into the head 39 of the opening 37 and then pulled forward to its desired new position. Suppose this occurs at cross bar 29. When the cross bar 29 is on top of the top surface of 35, the cable is slid into the leg 41 of opening 37 and released. The cable will be retained in its new position as cross bar 29 cannot pass through leg 41.

The same procedure is used to advance the accessory to a second position except that the cable is pulled forward until the cross bar of the second position is above the top surface of the means 35. To return the accessory to a lower, or the neutral, position, the cable is again moved into head 39, and the cable is released to be pulled back by the action of spring 21 to the position of the appropriate cross bar.

If the users wish to continually change sounds, they merely retain the cable in head 39 of the opening 37 and keep sliding the cable back and forth. If no sound is desired, then the accessory is shifted to the position wherein no fingers extend into the path of travel of the spokes.

Although in the illustrated embodiment three fingers extend from the plate 7, it will be appreciated that the invention could be practiced with a different number of fingers. In addition, more or less positions than the four shown could be provided.

The above description was provided for the purpose of illustrating, but not limiting, the invention. Various modifications, which will come readily to the mind of one skilled in the art, are within the scope of the claims as defined in the appended claims.

I claim:

1. A noise making accessory for vehicles having spoked wheels such as bicycles or the like for mounting on the bicycles adjacent the spokes of one of the wheels thereof, and comprising;
   a main body;
   a finger bearing member extending through said body from side to side thereof;
   a finger bearing member being mounted for rotation within said body;

a plurality of different sized fingers extending from one end of said finger bearing member; and means for rotating said finger bearing member;

whereby, in operation by rotation of said finger bearing member, and said fingers therewith, a different one, or different ones, of said fingers will be positioned in the path of travel of said spokes;

and further comprising a tap extending from the other end of said finger bearing member;

and wherein said means for rotating said finger bearing member comprises;

an actuator cable, attached, at one end thereof, to said tab, and for mounting, at the other end thereof, on the handle bars of a bicycle;

whereby, by pulling on said cable, said finger bearing member is rotated;

and further comprising a spring having one end thereof attached to said tab and the other end thereof attached to a fixed point on said body;

whereby said finger bearing member is urged to the non-tensioned position of said spring;

where said cable comprises a series of spaced cross bars at the other end thereof;

and further including actuator cable position maintaining means, comprising;

a box-like structure through which said cable extends;

a T-shaped opening in the top of said box-like structure;

whereby, to pull the cable and the cross bars through the box-like structure, the cable is slid into the head of the T-shaped opening so that the cross bars can pass through the opening; and when the position of the cable is to be maintained, the cable is slid into the leg of the T-shaped opening preventing the cross bars from moving through the opening.

2. An accessory as defined in claim 1 wherein said body is a hollow shell-like structure, and wherein said finger bearing member is mounted for rotation on an axle extending through said body from the top to the bottom thereof.

3. An accessory as defined in claim 2 wherein each finger is of a length different from the length of every other finger.

4. An accessory as defined in claim 3 wherein the longest finger is at one end of the fingers and the shortest finger is at the other end of the fingers, the fingers between said longest and said shortest finger decreasing in length from said longest finger to said shortest finger.

5. An accessory as defined in claim 3 comprising three fingers extending from the periphery of said plate-like member.

6. An accessory as defined in claim 1 wherein each finger is of a thickness different from the thickness of every other finger.

7. An accessory as defined in claim 1 wherein each finger is of a width different from the width of every other finger.

8. An accessory as defined in claim 1 wherein said body, said finger bearing member and said fingers are made of a plastic material.

* * * * *